United States Patent [19]

Amith et al.

[11] Patent Number: 5,170,041
[45] Date of Patent: Dec. 8, 1992

[54] TRANSMISSION METHOD TO DETERMINE AND CONTROL THE TEMPERATURE OF WAFERS OR THIN LAYERS WITH SPECIAL APPLICATION TO SEMICONDUCTORS

[75] Inventors: Avraham Amith; Charles Naselli, both of Roanoke, Va.; C. Scott Nevin, Albion, Ind.

[73] Assignee: ITT Corporation, New York, N.Y.

[21] Appl. No.: 585,655

[22] Filed: Sep. 20, 1990

Related U.S. Application Data

[62] Division of Ser. No. 399,729, Aug. 28, 1989, abandoned, which is a division of Ser. No. 157,196, Feb. 17, 1988, Pat. No. 4,890,933.

[51] Int. Cl.[5] .............................................. H05B 1/02
[52] U.S. Cl. ................................... 219/497; 219/494; 219/502; 219/121.43; 374/123
[58] Field of Search ...................... 219/121.43, 121.42, 219/121.83, 497, 502, 494; 156/345; 374/123, 121, 161

[56] References Cited

U.S. PATENT DOCUMENTS

| | | | |
|---|---|---|---|
| 3,664,942 | 5/1972 | Havas et al. | 219/121.42 |
| 4,180,722 | 12/1979 | Clewans | 219/502 |
| 4,238,672 | 12/1980 | Siess | 219/497 |
| 4,363,957 | 12/1982 | Tachikawa et al. | 219/502 |
| 4,708,677 | 11/1987 | Blank et al. | 374/123 |
| 4,873,415 | 10/1989 | Ma et al. | 219/121.83 |
| 4,948,958 | 8/1990 | Sweeney | 374/123 |

Primary Examiner—Mark H. Paschall
Attorney, Agent, or Firm—Arthur L. Plevy

[57] ABSTRACT

A method of accurately determining the temperature of a thin layer of bandgap material without requiring contact to the layer involves the use of optical radiation through the layer and the detection of optical absorption by the layer. The relationship between the temperature varying bandgap energy and the resulting optical absorption characteristics provides an indication of temperature independent of ambient temperature. Apparatus for performing high quality temperature detection and control is also provided.

15 Claims, 8 Drawing Sheets

TRANSMISSION METHOD TO DETERMINE AND CONTROL THE TEMPERATURE OF WAFERS OR THIN LAYERS WITH SPECIAL APPLICATION TO SEMICONDUCTORS

This application is a division of 07/399,729 filed Aug. 28, 1989 now abandoned, which is a division of 07/157,196 filed Feb. 17, 1988 now U.S. Pat. No. 4,890,993.

FIELD OF THE INVENTION

The present invention relates to temperature-process control procedures. More particularly, the invention is applicable to the precise detection as well as control of the temperature of a semiconductor crystal and is especially useful in process steps where contact with the crystalline surface must be avoided. An example of an application of the invention involves the processing of GaAs thin layers, or of wafers prior to the growth of epitaxial layers, where the temperature must be accurately known and controlled, and no physical contact to the wafer surface can be tolerated.

BACKGROUND AND SUMMARY OF THE INVENTION

In the processing of semiconductors, such as GaAs in this example, there are difficulties in measuring the temperature of wafers or of thin layers, especially in applications where the temperature has to be known accurately, and no physical contacts to the wafer (or thin layer) are permitted. Two examples of processes where these problems arise are "heat-cleaning" of wafers prior to growing subsequent layers on them by Molecular Beam Epitaxy, and pre-activation "heat cleaning" of photocathodes. The latter represents the present application of the invention.

A device which has been used, in an attempt to overcome these difficulties is the pyrometer, which utilizes the black-body (or "gray body") radiation of the sample in order to measure its temperature. This method, however, is valid only when the wavelength of the radiation used is such that its characteristic coefficient of absorption is very large in comparison with the reciprocal of the thickness of the wafer or the thin layer. Such is rarely the case with wafers or thin layers of semiconductors such as GaAs, since the long wavelength light ($\lambda > 1000$ nanometers) used in pyrometry is hardly absorbed (if at all) by the semiconductor whose bandgap energy exceeds that of the light. Only for thick wafers, having temperatures well above room temperature, can the pyrometric method be applied: in these situations, wavelengths of about 900 nanometers are employed.

Pyrometers, therefore, when used in applications to GaAs or to semiconductors of comparable bandgaps, almost always monitor the temperature of the body on which the semiconductor wafer rests rather than the actual temperature of the semiconductor material. In the case of the photocathode bonded to a glass faceplate, the pyrometer (utilizing radiation above 900 nanometers) absorbs radiation emitted by the glass faceplate. The cathode itself, which is totally transparent to such radiation, is not "seen" at all by the pyrometer; and, furthermore, the cathode layer introduces an additional complication by acting as a thin film interference filter. This latter effect causes the pyrometric temperature readings of the glass faceplate itself to be in error—depending on the thickness of the cathode layers. The thinner the cathode layer, the more sensitive the pyrometer reading to small variations in the layers' thickness.

The present invention is based on the monotonic change in the optical absorption coefficient as a function of temperature. In the specific example to which the invention is applied herein, the controlling phenomenon is the narrowing of the bandgap of the semiconductor (it is the direct optical bandgap in the case of GaAs) with increasing temperature. Since the absorption coefficient for light of a narrow spectral range, whose photon energy is slightly higher than the bandgap energy, depends on the separation between these two energies (i.e. the photon energy and the bandgap energy; see Eq. 2), it follows that the absorption coefficient will depend on the temperature of the GaAs wafer or thin layer. The energy of the narrow spectral range employed in this mode must be such that it stays above the band edge at all temperatures of interest (if, at any temperature, the bandgap exceeds the spectral energy, then the light will be transmitted unabsorbed and thus will cease to be a measure of the temperature).

Indeed, this invention is applicable to all materials whose optical absorption coefficient is a monotonic function of temperature. It is applicable, in particular, to all semiconductors and is enhanced by selecting narrow optical spectral ranges very close to the respective bandgaps. The underlying mechanism is the same as detailed in this description of the invention as applied to GaAs: the absorption of optical radiation close to the bandgap (and exceeding the latter's energy by a small amount) is a function of the bandgap. Since in all semiconductors the bandgap is a function of temperature, the invention applies to all semiconductors. It further applies to semiconductors wherein the bandgap is either direct or indirect.

It is the object of the present invention to determine the exact temperature of the semiconductor thin layer or wafer, without contacting it physically. The invention is based on measurement of optical transmission, utilizing a properly selected narrow band spectral range, which undergoes moderately weak absorption as it transits through the semiconductor. That optical transmission depends on the bandgap of the semiconductor medium. The bandgap, in turn, is a function of the temperature of that semiconductor layer within which the absorption takes place. Consequently, the optical transmission depends on the temperature of the layer or the wafer.

The present invention does not only provide a method of accurate determination of the temperature, but it furthermore is employed—through an electrical feedback loop—to control said temperature by adjusting the power to the heating agent. In general, an independent and constant light source can provide the light whose absorption in the wafer or layer is used to monitor the latter's temperature and, utilizing a loop to control the separate heating agent, maintain the above temperature at any desired value or values.

In the specific application of the invention to "heat cleaning" the wafer as described here, the heating agent is an incandescent projection lamp emitting white light which heats the wafer by being partly absorbed in it. The method of this invention is applied by selecting a very narrow spectral range of the white light from the projection lamp, and measuring its absorption by the wafer. In other words, the heating of the wafer and the light whose absorption is measured to monitor the temperature are both provided by the same source (the lamp).

Since the intensity of the lamp varies during the "heat-cleaning" process, the application of the invention contains a continuous comparison of the intensities of the light component transmitted through the wafer, with that emitted by the lamp. This "normalization" procedure enables us to separate those changes in transmission through the wafer which are due to the latter's varying temperature, from changes which are due to variations in the light intensity emitted by the lamp.

This invention overcomes all the aforementioned shortcomings of existing pyrometric methods.

These and other objects of the invention are achieved according to the invention by providing a source of optical radiation having a desired spectral component and directing that optical radiation to a layer of material having a bandgap which varies as a function of temperature. The optical radiation transmitted through the layer of semiconductor material is detected and analyzed to determine the optical absorption which has occurred. Due to the relationship between direct bandgap and optical absorption, analysis of the transmitted optical radiation will provide an indication of the direct bandgap of the material which, in turn, is indicative of the material's temperature.

For a semiconductor wafer or layer, an in situ temperature determination may be accomplished while the wafer is in a heating chamber even though the temperature detection apparatus is maintained outside the heating chamber. Of course, the temperature detection apparatus could just as well be wholly or partially within the chamber if it is tolerant of the processing temperatures. A light source, which may double as a heat source, is provided which emits light including light within a spectral range having a photon energy slightly higher than the bandgap energy of the semiconductor. Since the absorption coefficient for this spectral range depends on the separation between the photon energy and the bandgap energy, it is possible to derive information relating to the bandgap by examining the absorption by the GaAs wafer in the spectral range of interest. Additionally, the direct bandgap of GaAs narrows as temperature increases. Thus, information regarding the temperature of the GaAs wafer may be derived from the absorption of the identified spectral range.

DETAILED DESCRIPTION OF THE DRAWINGS

Figure 1:
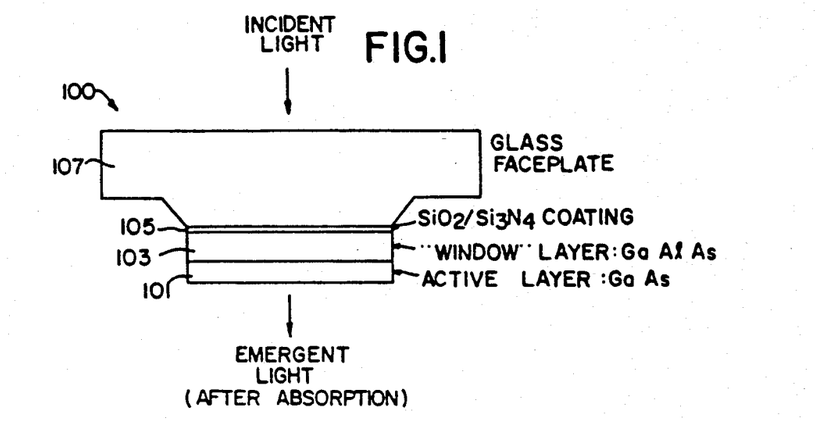
FIG. 1 illustrates a layer of GaAs on a supporting structure which is suitable for temperature monitoring in accordance with the invention.

An example of a layer of GaAs whose temperature may be directly determined according to the invention is the GaAs layer 101 on the surface of the GaAlAs layer 103 bonded, via the thin dielectric coating 105 to a glass faceplate 107, as shown in FIG. 1. Note that the "window" layer 103 is GaAlAs, with a much wider bandgap than the GaAs active layer 101. The property of the material on which this invention is based is the dependence of the bandgap on temperature, and the dependence of the optical absorption coefficient of light of a given energy on the difference between the latter and the bandgap energy (which must be smaller than the light energy). This property is found for instance in GaAs, other III-V compounds and other semiconductor materials such as silicon, CdS or HgCdTe. It applies to direct as well as indirect bandgap, although it is easier to exploit in the former. The above relationships may be expressed in the following manner:

1. $E_g = E_g(T)$
2. $\alpha(h\nu) = \alpha(h\nu - E_g)$, where $h\nu \geq E_g$ hence, 3. $\alpha = \alpha(T)$ Relation No. 1 states that the semiconductor bandgap energy, $E_g$, is a function of the temperature, T. Relation No. 2 states that the absorption coefficient, $\alpha$, for light of energy $h\gamma$ (where h is Planck's constant and $\gamma$ is the frequency) is a function of the difference between that energy and the bandgap energy $E_g$. Relation No. 3 states that as a result of the above, the absorption coefficient is a function of temperature.

Figure 2:
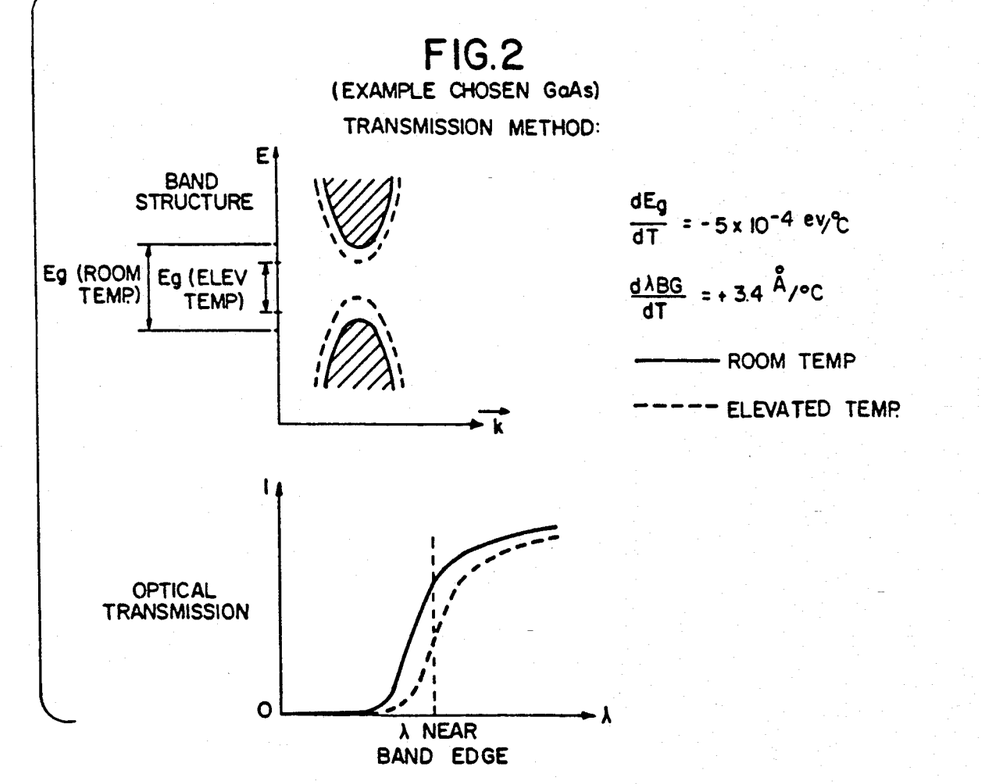
FIG. 2 is a plot showing the direct bandgap and optical transmission of GaAs as a function of temperature.

The pictorial rendition of the above is found in FIG. 2. The upper part of the figure shows the change in the direct bandgap of a semiconductor as a function of temperature (the example is a semiconductor, such as GaAs, whose direct bandgap decreases as the temperature increases). It is noted that the bandgaps of all semiconductors, whether such bandgaps be direct or indirect, are functions of temperature. In most semiconductors, the bandgaps narrow upon increasing the temperature: the values of $dE_g/dT$ range from $-14 \times 10^{-4}$ ev/°C. in selenium to 31 $0.3 \times 10^{-4}$ ev/°C. in tellurium, and the values of III-V compound semiconductors clustering between $-3 \times 10^{-4}$ ev/°C. and $-4 \times 10^{-4}$ ev/°C. In a few semiconductors, notably in the IV-VI compounds, the bandgaps widen upon increasing the temperatures, with values near $+4 \times 10^{-4}$ ev/°C. An example of a totally different class of materials where this invention is applicable, is a colloidal suspension of small particles in a matrix of another material, the more so if that matrix is amorphous, gel or a liquid ("Christiansen Filter"). In such cases, the absorption in selected spectral ranges is a strong function of temperature, making the present invention very applicable as a means to detect as well as control the temperature. The lower part of the figure shows the concomitant shift in the optical transmission curve.

The device of this invention measures the optical transmission at a selected wavelength through the sample whose temperature is to be determined, and is based on the temperature dependence of the optical coefficient of absorption.

The optical transmission of a selected wavelength through a given sample depends not only on its coefficient of absorption and on the thickness of the sample, but also on the reflectance properties at the various interfaces, on the level of doping and on possible stresses. The effects of these other factors on optical transmission through the sample are almost independent of temperature.

Figure 3:
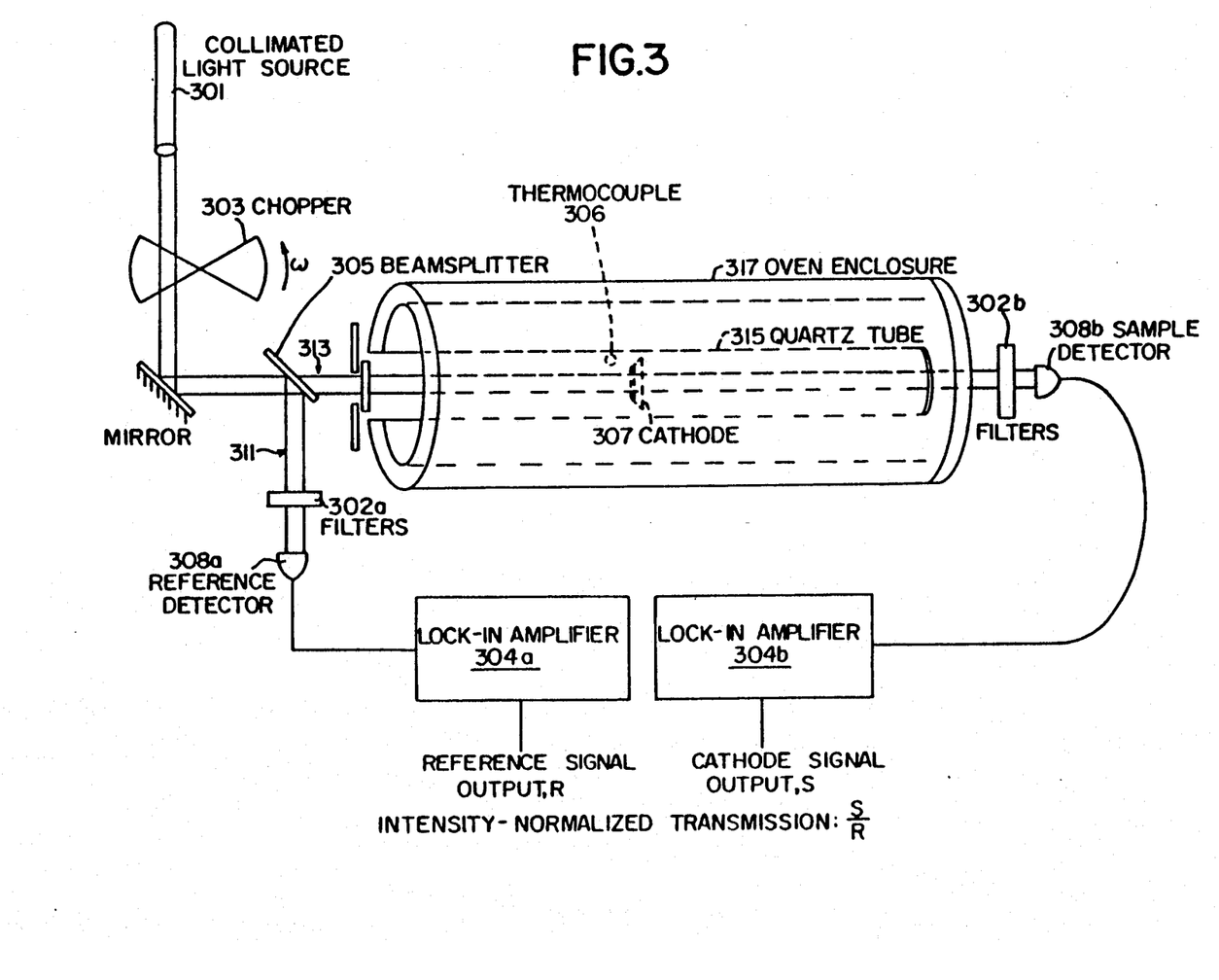
FIG. 3 illustrates a calibration setup for the invention.
Figure 4:
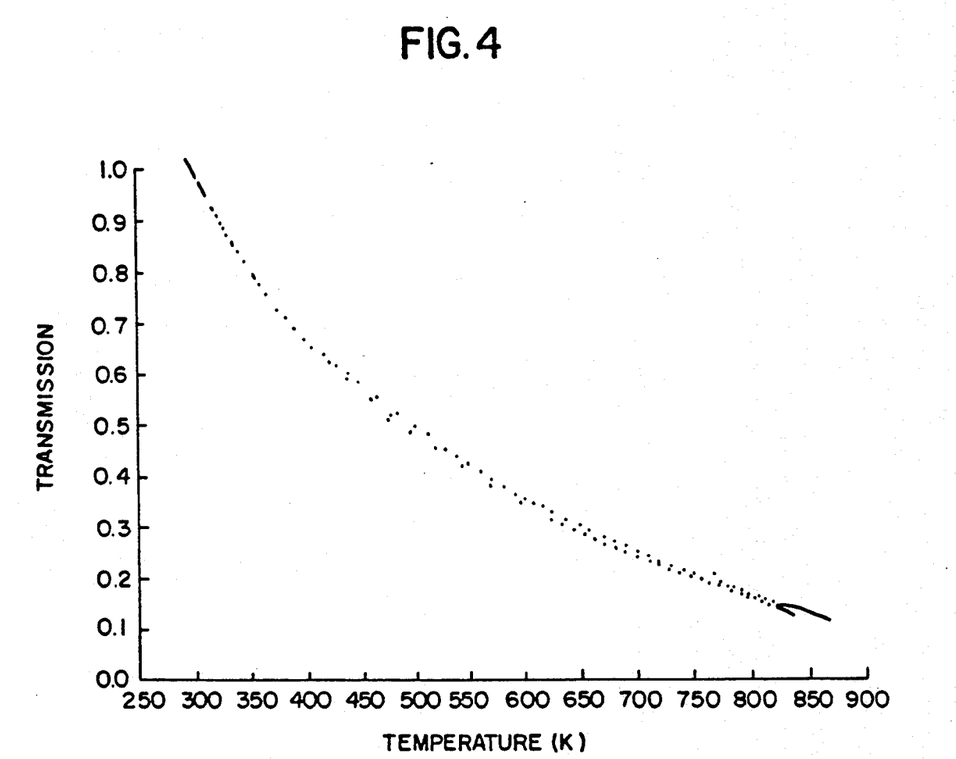
FIG. 4 is a plot showing normalized optical transmission during calibration.

The manner of calibrating the transmission measuring device is demonstrated in FIG. 3. The light from a lamp 301 is chopped by a chopper 303 and then split by a beamsplitter 305 into a "reference" channel 311 and a "signal" channel 313 which goes through the prototype sample 307. The two filters 302a, 302b in the respective channels are narrow bandpass filters which select the operating light energy (wavelength). The lock-in amplifier 304b monitors the sample signal via sample detector 308b, and lock-in amplifier 304a reads the reference signal received via reference detector 308a. The signals through the cathode, S, and the reference, R, are constantly compared to each other. The transmission is then simply the ratio of the former to the latter. The oven temperature is monitored by the thermocouple 306. The sample, in the oven enclosure, is at the temperature indicated by the thermocouple. A typical calibration curve is shown in FIG. 4, where the transmission was taken to be unity at room temperature. The scheme illustrated in FIG. 3 embodies a generic approach to measure the sample's temperature by the transmission method, resulting in the curve of FIG. 4.

As mentioned earlier, a specific utilization of this device is to monitor the temperature of a GaAs layer on a photocathode during "heat cleaning", or the temperature of a wafer (such as GaAs) during "heat cleaning" prior to growing epitaxial layers on the GaAs, for instance by the Molecular Beam Epitaxy method. In both cases, the source of the light used to measure transmission through the sample may conveniently be the same source used to heat the sample. Consequently, the careful monitoring of the light-source intensity, which changes during the heat-cleaning cycle, is essential.

Figure 5:
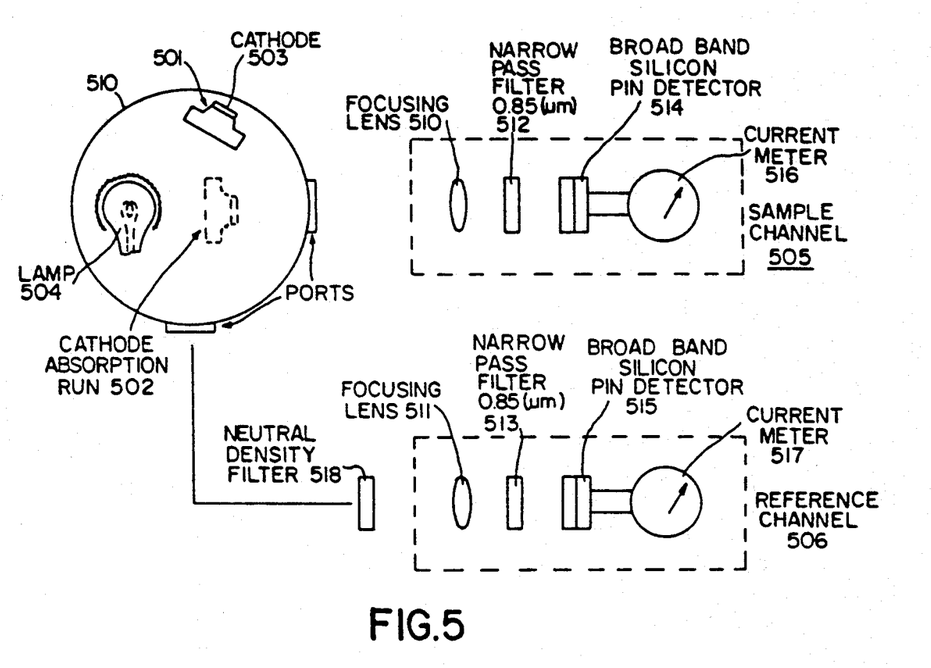
FIG. 5 illustrates a setup for monitoring the sample's temperature by implementing the invention.

The use of the invention in "heat cleaning" the photocathode sample 503 is shown in FIG. 5. The lamp 504 and the cathode 503 are shown within the vacuum chamber 510. With the cathode 503 out of the way in position 501, the sample channel 505 and the reference channel 506 are compared for normalization purposes. The cathode 503 is then moved into the path of the light at position 502, and a "room temperature reference signal" is taken, with the heating lamp at a sufficiently low intensity so as not to heat the cathode during this step. Next, the "heat cleaning" cycle proceeds as the lamp intensity is increased.

Figure 6:
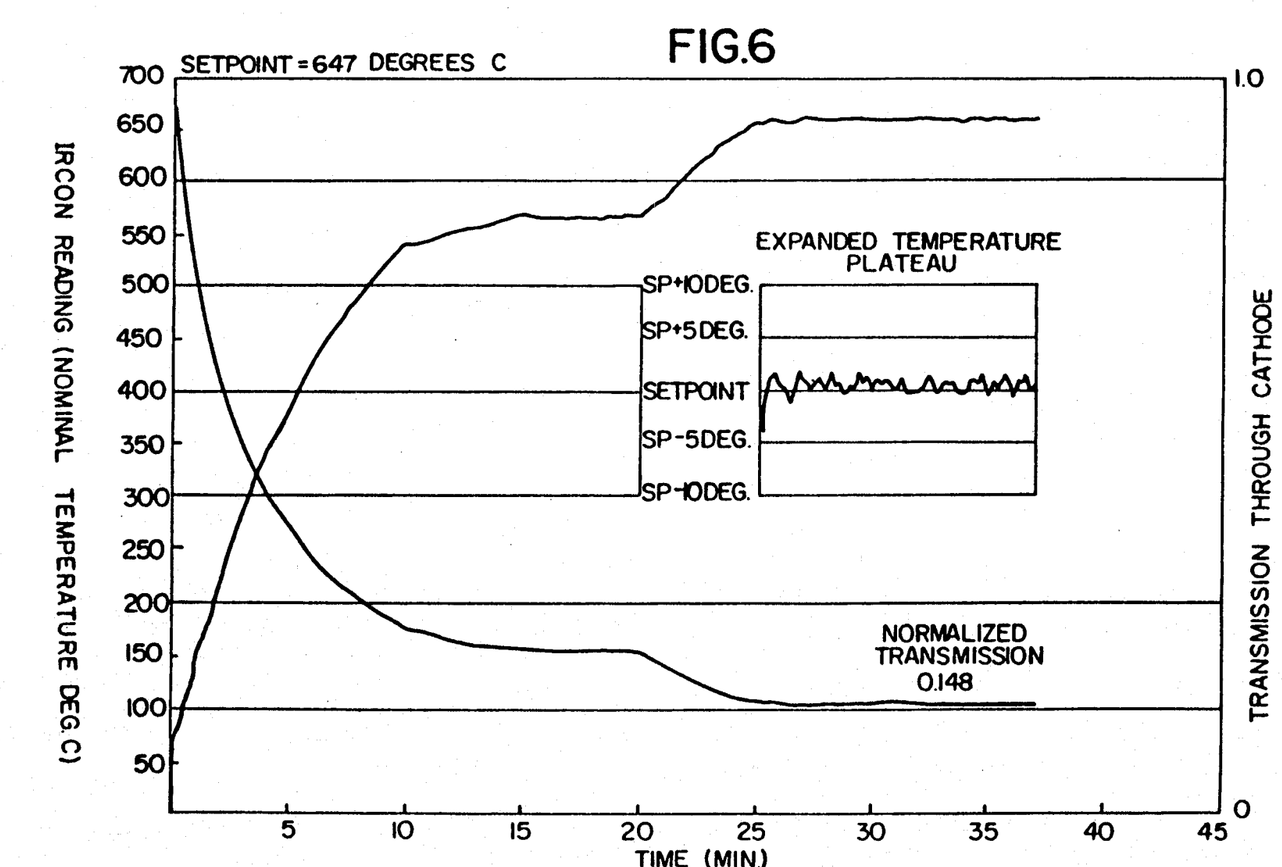
FIG. 6 is a plot showing normalized optical transmission in accordance with the invention and the temperature of the GaAs layer, during a "typical" heat-cleaning run.

The signals from the two channels are acquired by a computer, not shown, through two inputs of an A/D converter, not shown, and they are constantly being compared to provide a normalized (to constant optical flux) transmission profile which is converted to a temperature profile according to the calibration of FIG. 4. A typical "heat cleaning" process as monitored according to the invention is shown in FIG. 6. The transmission is seen to decrease as time goes on, due to the increase of the temperature of the cathode's active layer. The corresponding temperature can be deduced from FIG. 4 and incorporated into the software which is used to provide the plots similar to those shown in FIG. 6.

By doing this, a time-dependent temperature profile can be entered into the software, and the transmission would act as a thermometer which reads the real-time temperature and compares it (at frequent intervals) to the above "dialed-in" temperature. In FIG. 6, as an example, are seen two time plots: the nominal faceplate temperature read by the IRCON, and the cathode temperature indicated by the transmission through the cathode (in FIG. 6, the transmission values were not converted to cathode temperature; this would be done by using data at FIG. 4).

A description of the computer program to monitor the heat cleaning temperature and to control it, follows.

The software to control the heat clean process is written in a version of BASIC designed for measurement control purposes. The program uses the multitasking capability of this language to measure and control the process and to provide screen display, data storage and data printout.

With the cathode in the heat clean position, the heat clean lamp is operated briefly at low wattage. During this time, sampling measurements are made over a narrow wavelength band of light flux through the cathode and of light flux from the lamp. From these measurements a "room temperature" normalization ratio is computed. Subsequent measurements of transmission through the cathode are divided by this number to normalize the transmission to the room temperature value.

After a normalization ratio has been calculated, the heat clean process is begun. The computer periodically samples light flux from the lamp and through the cathode and calculates the transmission relative to the room temperature transmission. This value is compared to a setpoint value determined from a specified transmission versus time profile. The program is structured to readily accommodate changes in the desired shape and complexity of this curve. Using a PID (proportional-integral-derivative) algorithm, a correction to the lamp wattage is calculated and a corresponding command voltage is sent to the power supply controlling the lamp. This sequence is periodically repeated until the heat clean process is completed.

Figure 7:
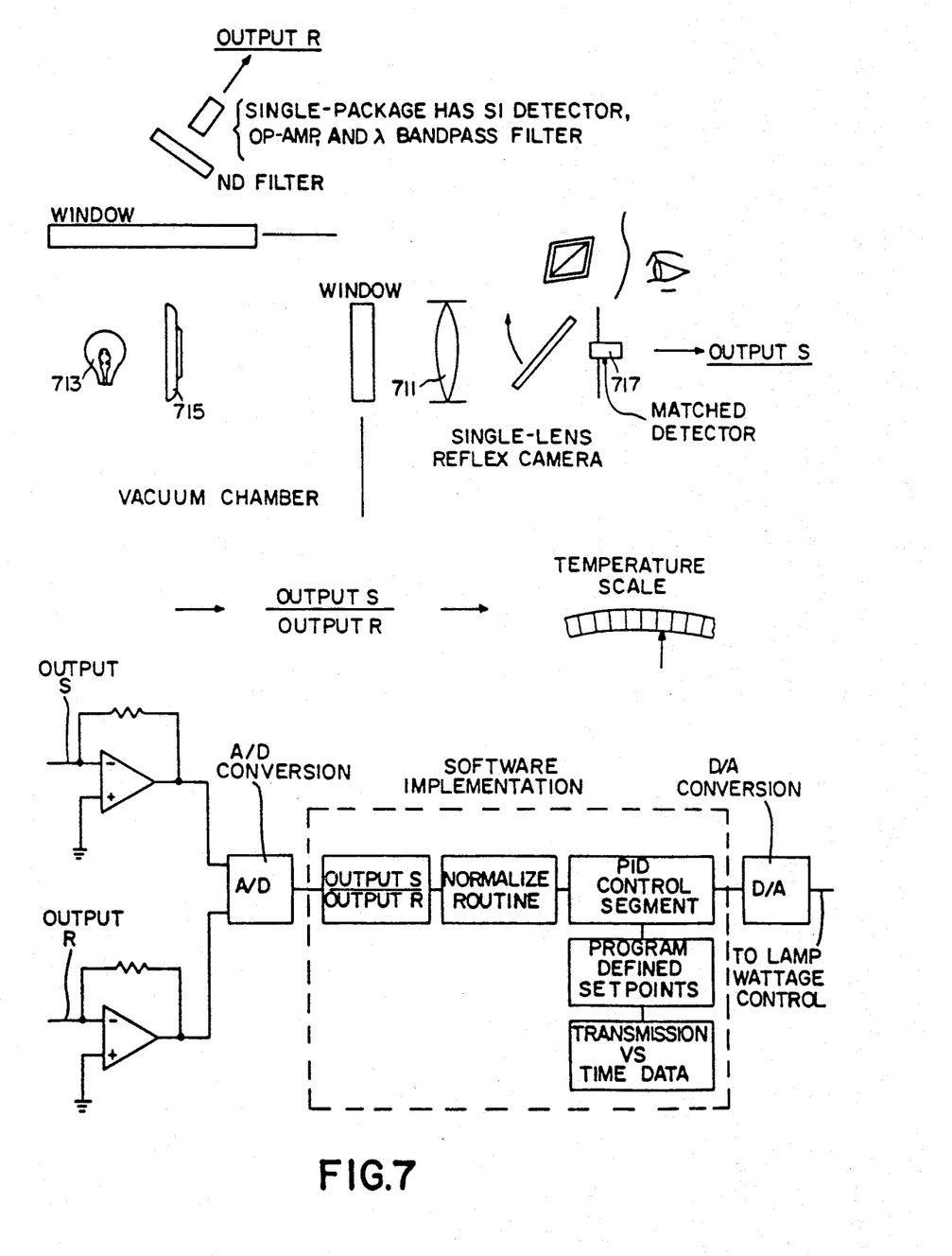
FIG. 7 is a schematic of a prototype of the invention.
Figure 8:
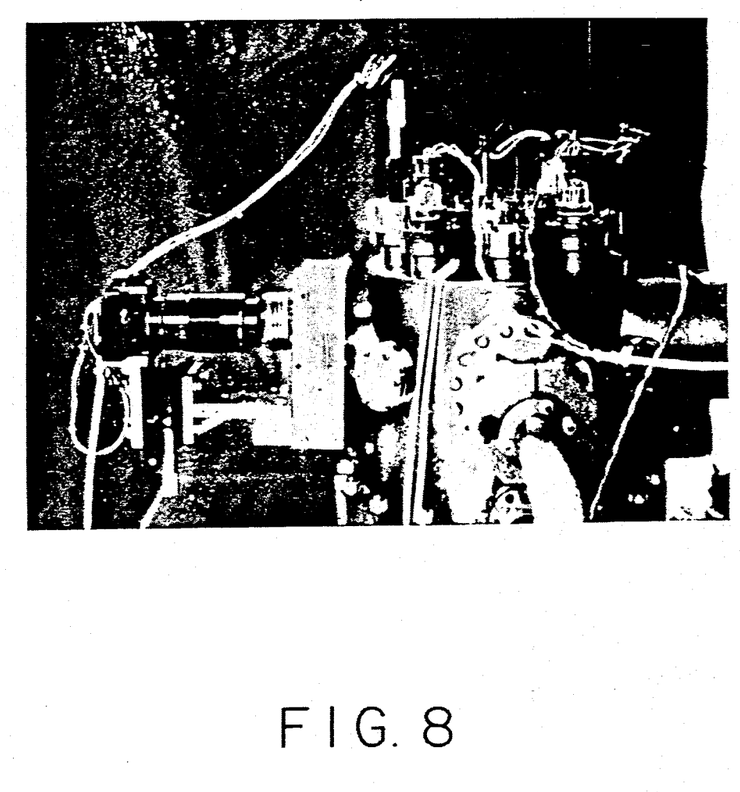
FIG. 8 is a photograph, illustrating a preferred manner of practicing the invention.

A preferred manner of practicing the invention utilizes an arrangement where a single-lens camera 711 is used to focus the lamp filament 713, viewed through the cathode 715, onto the detector surface 717 which is in the camera's focal plane. This is shown schematically in FIG. 7. The device itself, embodying the reference and sample channels, is shown in FIG. 8.

Figure 9:
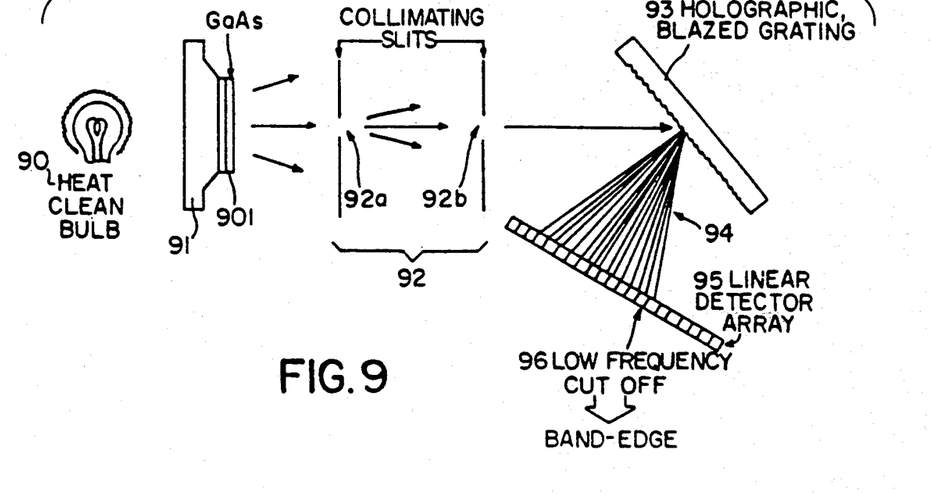
FIG. 9 is a schematic illustration of another preferred manner of practicing the invention.

An expanded version of the invention is illustrated in FIG. 9. Here, the temperature of the sample 91 is monitored by measuring the optical transmission properties of a group of wavelengths (all corresponding to optical energies slightly above the bandgap). The source of optical radiation 90 is a heat clean bulb which is aligned with a plurality of slits 92a, 92b arranged to substantially collimate the light. The sample 91, which comprises a layer 901 of a material having a direct bandgap which varies as a function of temperature, GaAs in this example, is placed so as to intercept the light between the bulb 90 and the slits 92. Thus, the light passing through the slits 92 has traversed the layer 901 of GaAs. A diffraction grating 93, a holographic, blazed grating in this example, is placed at an angle to the collimated light beam exiting slits 92 such that the light is dispersed, in a dispersed beam 94, onto the optical detector 95 which in this example is a linear detector array. The low frequency cutoff 96 is detected by the optical detector thus permitting temperature detection according to the procedures described with respect to the prior examples. Additional benefits can be obtained by the use of a detector capable of isolating a plurality of discrete wavelengths of optical energy. Since the functional dependence of $\alpha$ on (h $\gamma$ − Eg) (see Eq. 2) depends on the magnitude of (h $\gamma$ − Eg) (it approaches the asymptotic form $\alpha = \text{constant} \times (h\gamma - Eg)^{\frac{1}{2}}$), such an array would optimize the sensitivity of the method in different temperature ranges and will enhance the precision (which depends on normalization at room temperature).

Figure 10:
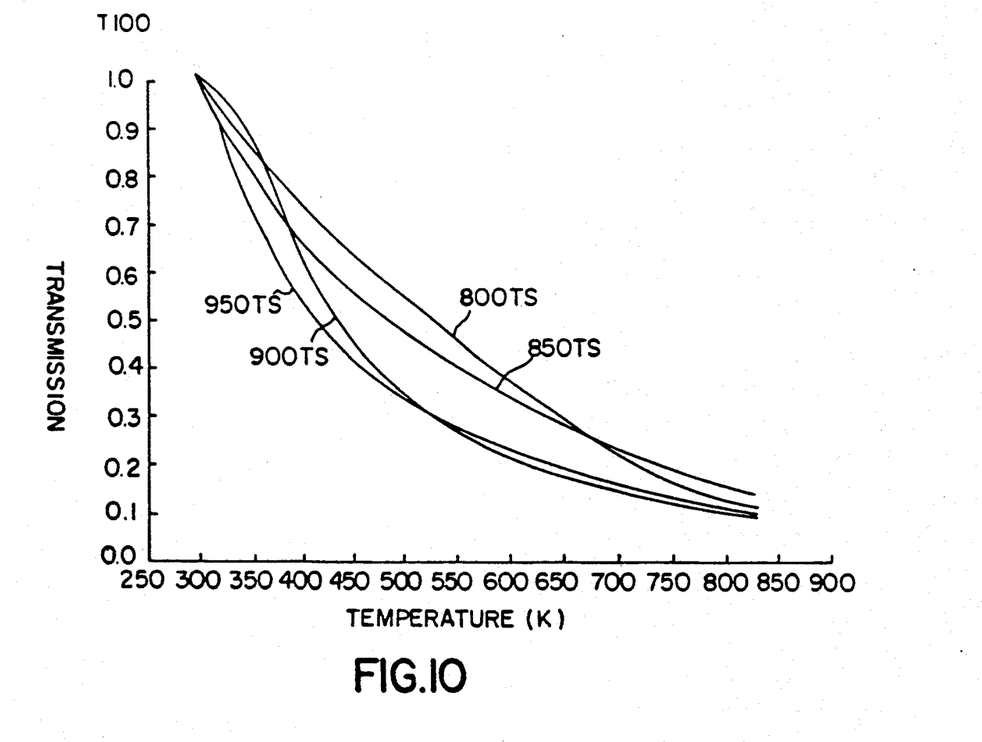
FIG. 10 is a plot showing optical transmission of multiple wavelengths as a function of the temperature of a GaAs layer (measurements performed as in FIG. 3).

A calibration run at four wavelengths near the band edge is shown in FIG. 10.

This method, and the device, are applicable to measure the temperatures of any semiconductor wafers or thin layers wherein the bandgap, and therefore the transmission, is temperature dependent.

In a layered structure, the method is usually limited to that layer with the narrowest bandgap.

The method requires a light source emitting an optical component which is only partly absorbed in the sample. The method is particularly applicable to monitoring the temperature, in the manner indicated, in those processes wherein the optical source acts as the heating source.

The method not only monitors and controls the temperature during the heating and "high temperature soak" (at a preset temperature) part of the cycle (see FIG. 6), but it also monitors the cooling rate of the sample and determines when the sample has cooled down to a preset temperature.

It is suited for any and all applications where physical contacts to the sample are undesirable, yet it could be applied equally well to situations where the heating mechanism is non-optical.

We claim:

1. An improved method of controlling the temperature of a layer of bandgap material comprising:
   providing a heat source, a temperature selection means for setting a programmed temperature, a light source and a light detector, said light source emitting light at an energy level slightly above the bandgap energy of said bandgap material, said light detector positioned to detect light from said light source which has passed through said layer of bandgap material, a signal translator for providing a detected temperature signal in response to an output signal from said light detector; and
   a feedback means wherein a feedback signal is fed from said light detector into said heating means, said feedback signal being proportional to the difference between the instantaneously detected temperature and said programmed temperature.

2. The method of claim 1, wherein said bandgap material is a semi-conductor.

3. The method of claim 2, wherein said bandgap material comprises a layer of GaAs.

4. The method of claim 3, wherein said layer of GaAs is on a substrate.

5. The method of claim 4, wherein said substrate includes a glass layer.

6. The method of claim 1, wherein said bandgap material is a photocathode comprising a layer of GaAs on a glass faceplate.

7. The method of claim 6 wherein said layer of GaAs is directly on a layer of GaAlAs and said GaAlAs is on said glass faceplate.

8. The method of claim 6, wherein a layer of GaAlAs is between said layer of GaAs and said glass faceplate.

9. The method of claim 1, wherein said light detector includes a detector array located to receive optical energy, from said light source, reflected from a holographic blazed grating.

10. The method of claim 1, wherein said heat source is an oven, said oven being monitored by a thermocouple that provides said detected temperature signal.

11. The method of claim 1, further comprising the step of displaying, on a display means, the measured temperatures of said bandgap material across a predetermined time interval.

12. The method of claim 1, wherein said light source is an incandescent lamp emitting "white light".

13. The method of claim 1, wherein said light source also acts as said heat source.

14. The method of claim 13, wherein wherein the heat generated by the optical energy of said light source is frequency dependent.

15. The method of claim 14, wherein said feedback means controls the frequency of optical energy striking said bandgap material.

* * * * *